United States Patent
Leonard

[15] 3,662,624
[45] May 16, 1972

[54] VEHICLE TRANSMISSION CONTROL

[72] Inventor: Lloyd H. Leonard, 14877 Valley Vista Blvd., Sherman Oaks, Calif. 91403

[22] Filed: June 5, 1970

[21] Appl. No.: 43,819

[52] U.S. Cl.................................................................74/865
[51] Int. Cl...........................................................B60k 21/00
[58] Field of Search..........................74/865; 192/3.54, 3.55

[56] References Cited

UNITED STATES PATENTS

| | | | |
|---|---|---|---|
| 2,754,691 | 7/1956 | May | 74/865 |
| 2,680,381 | 6/1954 | Maybach | 74/865 |
| 2,732,727 | 1/1956 | Livermore | 74/865 |
| 2,785,581 | 3/1957 | Roche | 74/865 |

*Primary Examiner*—Arthur T. McKeon
*Attorney*—Allan D. Mockabee

[57] ABSTRACT

An internal combustion engine control system including a continuously variable speed transmission at its lowest ratio when it rests, and increasing in ratio responsive to increases in transmission output, transmission output speed responsive means to adjust transmission ratios at a fixed throttle setting, the entire relationship between transmission output speed, the means responsive thereto to vary the transmission ratio and the throttle setting being such as to cause the engine to "lug" continuously at relatively low engine speeds in comparison with the normal currently recommended and used engine RPM vs. torque relationship. The term "lug" is herein used to describe the lowest engine speed at a given torque load which will provide acceptably smooth operation.

10 Claims, 1 Drawing Figure

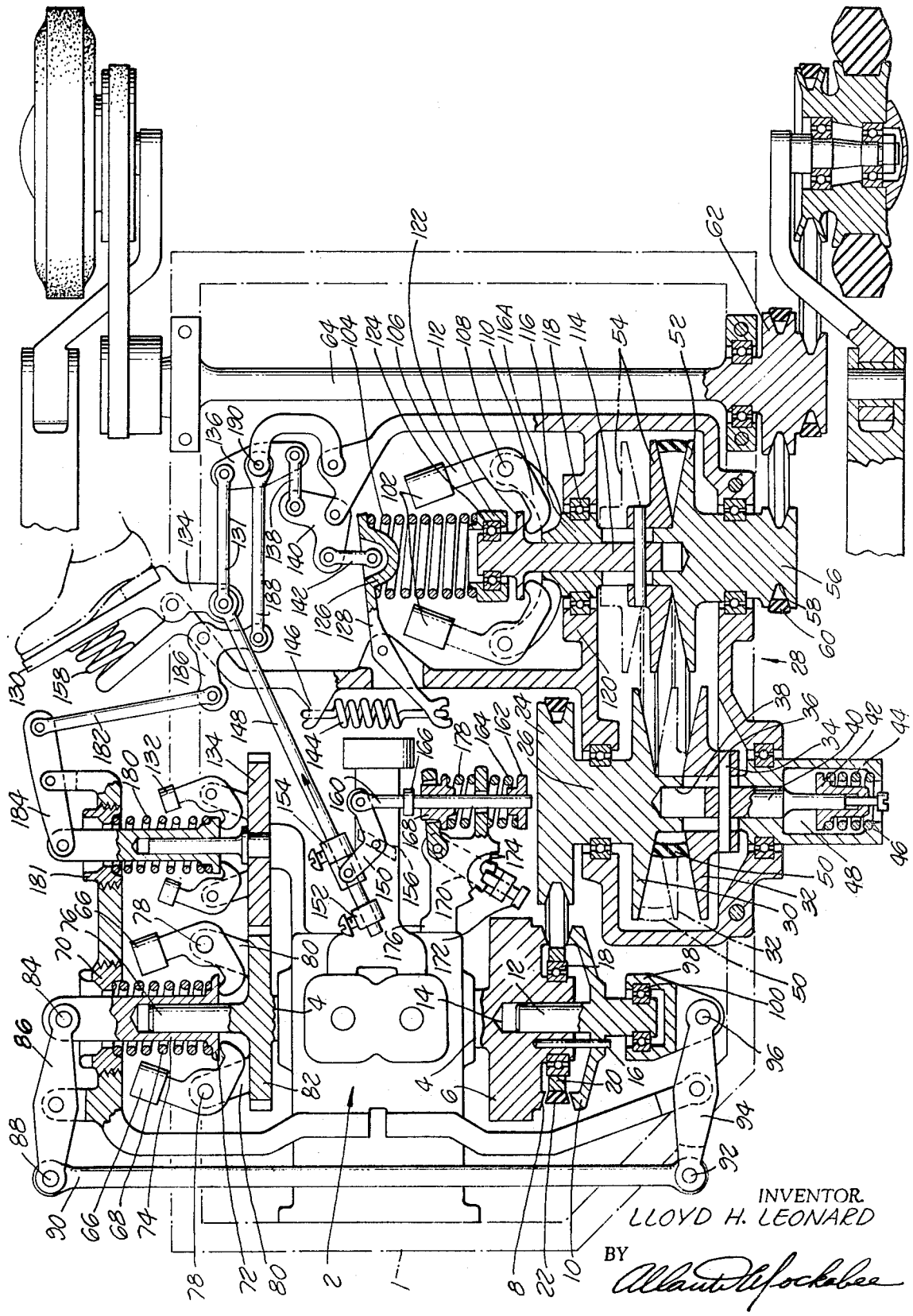
PATENTED MAY 16 1972 3,662,624
INVENTOR.
LLOYD H. LEONARD
BY
Allant... [signature]
ATTORNEY

VEHICLE TRANSMISSION CONTROL

Automotive design and development is determined largely by the basic design criteria and methods of approach pursued by automotive designers throughout the world. While in some respects these criteria and methods differ significantly between different designers and design groups, in other respects there is quite close agreement as to the objectives to be sought and how best to achieve them. It is in this latter area of generally close agreement which is of primary concern herein, and it is in this area of close agreement which this invention will propose a fundamental change in the mode of engine-transmission operation. This includes the automatic control of engine-speed-torque relationship to insure continuous lugging of the engine. Among automotive design groups there is general agreement that engine lugging should be avoided. The compelling reasons for changing to the lugging mode of engine operation are discussed in the following paragraphs.

The menace of smog or smog creating substances emanating from internal combustion engines represents an ever-growing threat to our modern urban civilization. The staggering quantities of irritants pumped into the atmosphere daily as a result of the tremendous consumption of hydrocarbon fuels by our internal combustion engines accounts for much of the smog problem. With the increase in engine sizes and in the quantity of motor vehicles, smog increases at an ever accelerating pace.

Another matter of great long range importance is the prospect of eventual hydrocarbon fuel depletion. More imminent than actual fuel depletion is the expectancy of greatly increased fuel costs when hydrocarbon fuels begin to become scarce. The occurrence of such scarcity may occur rather sooner than is generally realized.

Accordingly, it is quite important that means be found to reduce the present rate of consumption of hydrocarbon fuels, especially by automobile engines, by increasing the efficiency of the engine to reduce its consumption rate and also to reduce the amount of smog producing irritants exhausted therefrom.

One of the objects of the invention is to provide means by which a very substantial reduction in the fuel consumption of automobile engines may be realized. A full realization of the potential improvement requires a combination of numerous design features and necessitates some basic changes in many of the design criteria and methods of approach which prevail in automotive design and development today. However, of these numerous design features, I am presently concerned herein primarily with a new and unique method of transmission control which will cause the engine to operate throughout the normal range of vehicle driving speeds at or near the engine speed for maximum fuel economy.

Control, according to my invention, may be best applied to a transmission having a controlled but continuously variable speed ratio over a wide speed range.

Many engine transmissions have been developed and are presently being manufactured, such as certain types of hydraulic drives, friction drives, electric drives and V-belt drives, the latter having variable sheave spacing. However, the conventional automatic transmissions used on present day automobiles are not of the type which meet my basic objective, which is to so control the transmission that it causes the engine to lug while propelling the vehicle at various speeds. This may be achieved by providing means for keeping the engine throttle at a predetermined constant high setting for all possible driving speeds and providing means for varying the transmission ratio rather than the throttle setting to change the speed of the vehicle. The result is that the engine is caused to lug or in other words to run at the lowest practical engine speed for all car speeds except the very lowest speeds. Acceleration is achieved by momentarily increasing the transmission ratio, thereby allowing the engine to increase its speed and hence its power output as required at the same throttle setting. For maximum acceleration, the engine speed is thus increased to its maximum permissible value and kept there automatically by the means controlling the transmission ratio throughout the entire acceleration period, thereby assuring the highest possible rate of acceleration for an engine of given size.

The spectacular improvement in fuel economy that may be achieved by causing the engine to lug through my control means is substantiated by extensive test data for internal combustion engines. This data reveals a great increase in fuel consumption in terms of pounds of fuel per brake horsepower per hour at reduced throttle settings, and especially for very low throttle settings. Inasmuch as the ratio of fuel to air for an internal combustion engine must remain substantially constant in order for the engine to run at all, it is obvious that the amount of fuel consumed by the engine is essentially a function of the amount and density of the air it displaces at it runs. Even allowing for changes in air density as affected by manifold pressure (which depends largely on throttle setting) fuel consumption will vary primarily as a function of the engine displacement per mile traveled. This criterion of fuel consumption is generally accepted by automotive engineers and often presented in comparative automotive data as an approximate measure of the expected relative fuel economy for various types of automobiles. Generally the actual fuel economy, as revealed by test runs, approximates the economy predicted by the displacement per mile criterion mentioned above.

Consequently, by providing means for varying the transmission ratio to cause the engine to lug at all times, and therefore to run at the lowest possible engine speed, the engine displacement per mile will be maintained at the lowest practical value, with consequent spectacular improvement in fuel economy as compared with engines having any other type of transmission control.

My transmission control, designed to cause the engine to lug, will increase the engine torque input to the transmission because the required engine power will be produced at a high throttle setting and low engine speed. Inasmuch as power is proportional to torque times engine speed, it follows that a reduction in engine speed necessitates an increase in engine torque in order to maintain the same horsepower. Conventional automatic transmissions in present day automotive use utilize a fluid coupling which has significant internal slippage when torque is applied, with resultant power loss, particularly at low engine speeds and with high torques. For that reason, a fluid coupling is not utilized in my system.

While an engine lugging type of transmission, such as mine, will significantly improve fuel economy, the full potential of fuel economy cannot be realized without a reduction in engine size. This objective requires that the engine be of the smallest practical piston displacement consistent with power requirements for highway speed, acceleration and hill climbing.

A considerable reduction in required horsepower can be achieved through improvement in aerodynamic design, friction and weight reduction and in other areas, but I am concerned herein primarily with fuel economy achieved through a transmission and control therefor which will maintain engine lugging. This feature is in contrast to presently known transmission characteristics which are such as to cause the engine to race rather than to lug in steady driving. In present motor vehicles the relative throttle setting is low and fuel economy is poor because the engine is operating at high engine displacement per mile. By permitting the engine to race, input torque to the transmission is low and therefore the internal slippage is minimized; whereas, with conventional automatic transmissions, a change in the transmission ratio tending to cause the engine to lug would increase the internal slippage and power loss of the fluid coupling. Thus, any improvement in engine economy would be at least partially offset by increased transmission losses.

Other objects and advantages will more fully appear from the following description in connection with the accompanying drawing.

The FIGURE is a sectional view through an embodiment of the invention, the elements of which are shown more or less diagramatically and with some parts viewed from different angles from others.

The drawing illustrates an engine transmission and drive system mounted in a sub-frame to constitute an integrated power and drive unit sub-assembly. It is contemplated that such a unit may be attached to an automobile at its lower rear end to provide an easily removable rear engine, rear drive power unit, and while it is a feature of my overall automotive vehicle concept, it is not of course an essential feature of the transmission control system, or of the invention described in this disclosure.

There is illustrated a sub-frame 1 in broken lines. Upon this frame is suitably mounted an internal combustion engine indicated generally at 2. It is shown provided with a crank shaft 4 having a flywheel 6 on the end thereof. Incorporated in the flywheel 6 is a V-belt drive including a fixed sheave surface 8 on the flywheel which cooperates with an axially movable sheave 10 slidable on a stub shaft 12 in a suitable bore 14 in the flywheel 6. The sheave 10 is secured for rotation with the flywheel by a pin 16 upon which it can slide and which is anchored in the flywheel. Surrounding a suitable ball bearing assembly 18, which lies about the flywheel hub and about the bearing assembly, is an idler ring 20 upon which a V-belt 22 can lie when the clutch comprising sheaves 8 and 10 is separated as illustrated. When the sheave 10 is moved toward the fixed sheave surface 8, the belt 22 will ride up between the two sheaves in the manner known in connection with variable pulley arrangements.

The belt 22 extends about a pulley 24 on the input shaft 26 of a variable ratio V-belt transmission generally indicated at 28. The input shaft 26 carries a variable ratio relatively fixed pulley element 30 in conjunction with which is an adjustable pulley element 32 slidable axially on the input shaft 26 and rotated therewith by means of a pin 34 having its ends anchored in the hub of the pulley element 32 and having its intermediate portions extending through longitudinal slots 36 in the input shaft 26. Said input shaft has a bore 38 in which slides a stem 40 whose outer end carries a spring seat 42. A compression spring 44 is located between an end of the input shaft 26 and the spring seat 42, the spring seat and spring being located in a chamber 48 formed in the end of said input shaft 26. A V-belt 50 is mounted between the pulley elements 30,32 and a pulley comprising a stationary element 52 and a movable element 54, the stationary element 52 comprising a portion of the transmission output shaft 56. The output shaft 56 has a pulley groove 58 formed therein to receive a belt 60 which extends to a pulley 62 on the vehicle axle 64.

When the pulley assembly 8,10 is in the declutched position illustrated, tension of the belt 22 is relaxed and no torque is transmitted from the engine to the transmission output shaft 26.

Control of the clutching action of the pulley 8,10 is accomplished automatically as a function of engine speed by means of the centrifugal force of a pair of flyweights 66 which move outward with increased engine speed, overcoming a spring 68 located between a suitably supported stationary anchor 70 and a movable spring seat element 72 which is on the end of a sleeve 74 slidable on a post 76 which forms an extension of the crank shaft 4 lying at the opposite side of the engine 2. The flyweights 66 are pivotally mounted at 78 on lugs 80 diametrically opposite each other on a gear 82 which is shown integral with but preferably is separate and mounted upon the engine crank shaft 4.

Upon increased speed of the crank shaft 4, the flyweights 66 will move outwardly causing the spring 68 to be compressed and the sleeve 74 to move upwardly as viewed in the drawing. The upper end of the element comprising the sleeve 74 is pivotally mounted at 84 to one end of a rocker arm 86 whose other end is pivotally connected at 88 to a rod 90. The other end of rod 90 is pivotally connected at 92 to a rocker arm 94 suitably pivotally supported at its center. The opposite end of the rocker arm is pivoted as at 96 to a cap 98 connected for relative rotation through a suitable bearing 100 to the stub shaft 12 which carries the adjustable sheave element 10.

The variable ratio V-belt transmission 28 is typical of many such transmissions now available on the market and as shown, features the use of fixed and variable sheaves to accomplish a wide range of change in the transmission ratio. In the transmission illustrated, the sheave 32 on the transmission input shaft 26 is axially variable, its position being controlled by the balance between the wedging force of the V-belt 50 tending to force the variable sheave 32 downwardly and the opposing force of the spring 44.

On the output shaft 56 of the transmission 28, the upper sheave 54 is axially variable, its position relative to the variable sheave 32 on the input shaft being reversed to maintain belt alignment. Control of the axial position of the variable output sheave 54 is regulated by the centrifugal force of a pair of flyweights 102 and said axial position is determined by the balance between the force exerted by the flyweights 102 and the opposing downward force of a spring 104. The flyweights 102 are on bell cranks 106 pivotally mounted at 108 and having lower arms 110 disposed beneath a flange 112 on a stub shaft 114 axially slidable through a collar 116 which is rotatable in a bearing 118 carried by a portion 120 of the housing of the engine and transmission assembly. The upper end of the stub shaft 114 carries a seat 122 for the spring 104, said seat being mounted on a bearing 124 interposed between the stub shaft 114 and the seat. The upper end of spring 104 is seated about a spring seat 126 on a lever 128 forming part of an additional control mechanism. The variation of the force of the spring 104 is determined primarily by the position of the accelerator pedal 130 and secondarily by a pair of fly-weights 132 pivotally mounted on a gear 134 and geared to the crank shaft gear 82. Inasmuch as the centrifugal force of the flyweights 102 is a function of vehicle speed since they are mounted on the transmission output shaft 56 by means of lugs 116A on the collars 116, the latter being a part of the output shaft 56, the speed of the transmission output shaft 56 is a function of vehicle speed, since it is geared directly to the rear axle 64 by means of the belt 60. Therefore, in view of these relationships, the ratio of the transmission 28 is controlled partly by the position of the accelerator pedal 130, and partly by the car speed with an additional override effect at high engine speed.

As viewed in the drawing, the transmission 28 is in the low ratio position and the clutching V-belt 22 is disengaged so that the vehicle may be presumed to be at a standstill but ready to move with the engine idling. To start movement of the vehicle, the accelerator pedal 130 is depressed. For an easy start only a slight depression of the pedal is needed. This increases pressure on the spring 104 on the upper end of the transmission output shaft through the action of the linkage comprising a rod 131 pivotally connected to a lower extension 134 of the accelerator pedal and to a bell crank 136, a link 138, a bell crank 140 and a link 142 to the spring seat or anchor 126 on the lever 128.

A negative spring action may be utilized to compensate the force of the spring 104 and minimize the force required to depress the accelerator 130. This is accomplished by means of the lever 128, one of whose ends has connected thereto a tension spring 144, the other end of the spring being secured to a suitable stationary anchor 146.

Depression of the accelerator pedal 130 also moves a rod 148 which is connected to the lower extension 134 of said accelerator pedal. This moves the rod 148 in the direction of the arrow thereon and through a bell crank 150, an end of which is slidably connected to the rod 148 between a pair of stops 152 and 154, and opens the engine throttle, indicated in broken lines at 156. This of course causes the engine speed to increase. The stops 152 and 154 are adjustable on the rod 148. Prior to depressing the accelerator pedal 130 the throttle 156 is held in the closed or idling position by the force of an accelerator pedal spring 158 against which the pedal acts when said pedal is depressed. Prior to depressing the accelerator pedal 130 however, the throttle 156 is held in its closed or idling position by the accelerator spring 158 which moves the rod 148 to the left as viewed in the figure, raising the pin 160 and the spring seat 162 and overcoming a weaker spring 164 which normally acts downwardly to exert a yielding throttle opening force on the throttle 156, assisting the action of the accelerator pedal 130 and its linkage to the throttle. Continued depression of the accelerator pedal 130 permits the throttle to open until a stop 166 on the pin 160 engages a member 168. The position of the abutment member 168 relative to the stop 166 can be adjusted by adjustment of an arm 170 with a pin 172 selectively receivable in one of a series of notches 174 on a suitable bracket 176. Depression of the accelerator pedal 130, by causing motion of the rod 148 in the direction of the arrow, allows the pin 160 to move downwardly under the action of the spring 164 until the stop 166 engages the abutment member 168, at which point the predetermined high throttle setting is reached which preferably may correspond to 0.7 to 0.8 full throttle as determined by the setting of arm 170. Further depression of the accelerator pedal 130 causes no further increase in the throttle position, thereby allowing change in vehicle speed solely by variation of the transmission ratio, until the accelerator pedal is sufficiently depressed to cause the stop 152 to engage the bellcrank 150. If the accelerator pedal 130 is depressed further, it will cause the bell crank lever 150 to move the pin 160 and stop 166 downwardly against the action of a spring 178 which acts counter to the spring 164 beneath it about the pin 160. This makes full engine power available for fast acceleration, hill climbing, or greater than normal driving speed. However, the spring 178 is of sufficient strength that depression of the accelerator pedal 130 to move the bell crank 150 and pin 160 and bring stop 166 into engagement 168, can be felt by the driver who then knows that further depression will result in the greater than normal predetermined high throttle opening.

When the vehicle is at rest and the engine is speeded up as a result of depression of the accelerator pedal, the increase in engine speed will result in outward movement of the flyweights 66 and engagement of the clutch provided by the pulley members 8 and 10 and the car will begin to move forward. At the same time, the spring 44 in the lower end of the transmission input shaft 26 yieldably urges the sheave or pulley element 32 upwardly toward its stationary counterpart 30 with the result that the V-belt 50 will move to the left as viewed in the figure, thereby decreasing the speed reduction ratio of the transmission. As vehicle speed increases the throttle setting is reduced by reduction of pressure on the accelerator pedal 130 and engine speed decreases.

The flyweights 132 which rotate at some ratio of engine speed are held inward in the illustrated position by a spring 180 which may be adjusted by a threaded nut 181 so that the flyweights 132 will move outwardly only at or near the maximum safe speed of the engine. When this maximum safe speed is exceeded, the resulting outward movement of the flyweights 132 moves a rod 182 through the action of a walking beam 184 and rod 182 through a bell crank 186 and rod 188. Rod 188 is moved to the right, moving with it the center pivotal support 190 of lever 136. This overrides the control through rod 131 from the accelerator pedal and reduces pressure on the spring 104. As a result, flyweights 102 move outward and cause the sheave element 54 to move upward, thereby changing the transmission ratio and causing a reduction in engine speed. This overriding control by the flyweights 102 automatically prevents the engine from overspeeding while the vehicle is in motion, thereby safeguarding the engine against damage.

While I have illustrated a variable ratio V-belt type transmission in conjunction with the various controls to provide engine lugging and resultant greater efficiency and economy, any type of transmission can be utilized having a controllable continuously variable ratio. Among others this might include hydraulic transmissions, electric drives and other friction drives than the ones shown.

From the foregoing, it will be seen that I have provided a combination engine and transmission control system, such that for most normal steady operating conditions, the throttle setting is held constant at a high value, variations in the torque output requirements, such as may result from changes in vehicle speed, road gradement, etc. being accommodated by varying the transmission ratio, the actual ratio being determined automatically, depending on the accelerator pedal position and the torque requirements. Provision is made also, for automatic departure from the predetermined high throttle setting, as required for low vehicle speeds, rapid acceleration, steep hill climbing, etc. Adherance to a high constant throttle setting during most steady normal operating conditions, assures a continuous lugging of the engine, with resultant greatly improved fuel economy and reduced exhaust emissions.

It will of course be understood that various changes can be made in the form, details, arrangement and proportions of the various parts without departing from the spirit of the invention.

I claim:

1. An internal combustion engine control system including an engine having fuel supply control means and a continuously variable speed transmission with releasable engaging means connecting the engine and transmission, wherein the improvement comprises: said fuel supply means having a predetermined substantially fixed maximum fuel supply setting, means for engaging said releasable engaging means to transmit engine motion to said transmission, the transmission, when at rest, being at its lowest drive ratio and being continuously variable to higher ratios in response to increases in transmission output speed, means responsive to changed transmission output speed and operable to adjust the transmission to different drive ratios at said maximum fuel supply setting, and the relationship between said means responsive to changed transmission output speed and said substantially fixed fuel supply setting being such as to cause the engine to lug continuously at relatively low engine speeds for required power output.

2. The structure in claim 1, and an engine speed responsive actuator for said releasable engaging means.

3. The structure in claim 1, and said transmission including drive ratio varying means associated with said transmission and responsive to output speeds thereof.

4. The structure in claim 3, and said fuel supply control means comprising a throttle valve, throttle lever, spring means yieldably biasing said drive ratio varying means, and said spring means being associated with said throttle lever to increase the biasing action of said spring means upon movement of said throttle lever toward an open throttle position.

5. The structure in claim 1, and said fuel supply control means comprising a throttle having operating movement from a nearly closed engine idling position to a fully open position, and a yieldable stop in the path of movement of said fuel supply control and positioned to yieldably restrain the throttle at less than said fully open position.

6. The structure in claim 5, and said stop being positioned to yieldably restrain the fuel supply control at approximately 0.7 to 0.8 of the fully open throttle position.

7. The structure in claim 5, and said yieldable stop being positioned to yieldably restrain the fuel supply control at approximately 0.7 to 0.8 of the fully open throttle position, and said engine speed responsive releasable engaging means actuator being operable to connect the engine to the transmission within the limits provied by 0.7 to 0.8 open throttle position.

8. The structure in claim 1, and said fuel supply control means comprising a throttle having an operating movement toward open and closed throttle positions, yieldable stop means for said fuel supply control positioned to yieldably restrain the fuel supply control at less than its fully open throttle position, and means for varying the yielding resistance of said yieldable stop means.

9. The structure in claim 1, and said fuel supply control means comprising a throttle and a throttle lever having a variable bias connection with said drive ratio varying means, and a speed responsive device drivingly connected to said engine and directly responsive to engine speed and also connected to said variable power connection.

10. The structure in claim 1, and said drive ratio varying means comprising an adjustable drive ratio device, speed responsive means connected to said adjustable drive ratio device, means biasing the adjustable drive ratio device toward a lowered drive ratio, and a connection between said fuel supply control means and said biasing means to increase the bias of the latter upon movement of said fuel supply control to a more open throttle position.

* * * * *